US009129005B2

(12) United States Patent
Waters

(10) Patent No.: US 9,129,005 B2
(45) Date of Patent: Sep. 8, 2015

(54) METHOD AND APPARATUS FOR SEARCHING A HIERARCHICAL DATABASE AND AN UNSTRUCTURED DATABASE WITH A SINGLE SEARCH QUERY

(75) Inventor: Christopher Waters, Los Altos, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 74 days.

(21) Appl. No.: 13/272,040

(22) Filed: Oct. 12, 2011

(65) Prior Publication Data

US 2012/0084296 A1 Apr. 5, 2012

Related U.S. Application Data

(63) Continuation of application No. 11/982,699, filed on Nov. 2, 2007, now Pat. No. 8,046,353.

(51) Int. Cl.
*G06F 7/00* (2006.01)
*G06F 17/30* (2006.01)

(52) U.S. Cl.
CPC .... *G06F 17/30607* (2013.01); *G06F 17/30327* (2013.01); *G06F 17/30336* (2013.01); *G06F 17/30442* (2013.01); *G06F 17/30864* (2013.01)

(58) Field of Classification Search
CPC ................... G06F 17/30336; G06F 17/30442; G06F 17/30864
USPC ........................................................ 707/715
See application file for complete search history.

(56) References Cited

U.S. PATENT DOCUMENTS

| | | | | |
|---|---|---|---|---|
| 5,913,214 A | * | 6/1999 | Madnick et al. | 1/1 |
| 6,282,537 B1 | * | 8/2001 | Madnick et al. | 707/716 |
| 6,397,221 B1 | * | 5/2002 | Greef et al. | 1/1 |
| 7,136,851 B2 | * | 11/2006 | Ma et al. | 707/770 |
| 7,743,066 B2 | * | 6/2010 | Meijer et al. | 707/769 |
| 7,774,361 B1 | * | 8/2010 | Nachenberg et al. | 707/779 |
| 7,840,556 B1 | * | 11/2010 | Dayal et al. | 707/721 |
| 2002/0120598 A1 | * | 8/2002 | Shadmon et al. | 707/1 |
| 2002/0184219 A1 | * | 12/2002 | Preisig et al. | 707/10 |
| 2003/0033275 A1 | * | 2/2003 | Alpha et al. | 707/1 |
| 2003/0065874 A1 | * | 4/2003 | Marron et al. | 711/100 |
| 2003/0101169 A1 | * | 5/2003 | Bhatt et al. | 707/3 |
| 2003/0135495 A1 | * | 7/2003 | Vagnozzi | 707/3 |
| 2003/0233224 A1 | * | 12/2003 | Marchisio et al. | 704/4 |
| 2004/0039734 A1 | * | 2/2004 | Judd et al. | 707/3 |
| 2004/0186826 A1 | * | 9/2004 | Choi et al. | 707/3 |
| 2005/0055336 A1 | * | 3/2005 | Hui et al. | 707/3 |
| 2005/0055355 A1 | * | 3/2005 | Murthy et al. | 707/100 |
| 2005/0076003 A1 | * | 4/2005 | DuBose et al. | 707/1 |
| 2005/0198017 A1 | * | 9/2005 | Gaponoff | 707/3 |
| 2006/0053128 A1 | * | 3/2006 | Gestrelius et al. | 707/101 |
| 2006/0271353 A1 | * | 11/2006 | Berkan et al. | 704/9 |
| 2007/0179932 A1 | * | 8/2007 | Piaton | 707/3 |
| 2007/0198480 A1 | * | 8/2007 | Hogue et al. | 707/3 |

(Continued)

OTHER PUBLICATIONS

Florescu et al., "Integrating Keyword Search Into XML Query Processing," Computer Networks, 33:119-135 (2000).

(Continued)

*Primary Examiner* — Mark E Hershley
(74) *Attorney, Agent, or Firm* — BainwoodHuang

(57) ABSTRACT

Techniques for searching a hierarchical database and an unstructured database with a single search query are described herein.

25 Claims, 9 Drawing Sheets

(56) References Cited

U.S. PATENT DOCUMENTS

| | | | |
|---|---|---|---|
| 2007/0239741 A1* | 10/2007 | Jordahl | 707/100 |
| 2007/0273518 A1* | 11/2007 | Lupoli et al. | 340/572.1 |
| 2008/0040342 A1* | 2/2008 | Hust et al. | 707/5 |
| 2008/0065596 A1* | 3/2008 | Shadmon et al. | 707/2 |
| 2008/0082501 A1* | 4/2008 | Hardy | 707/3 |
| 2008/0104061 A1* | 5/2008 | Rezaei | 707/5 |
| 2008/0263006 A1* | 10/2008 | Wolber et al. | 707/3 |
| 2008/0288641 A1* | 11/2008 | Messer et al. | 709/226 |
| 2009/0089277 A1* | 4/2009 | Cheslow | 707/5 |
| 2009/0199230 A1* | 8/2009 | Kumar et al. | 725/32 |

OTHER PUBLICATIONS

Supplementary European Search Report dated Sep. 30, 2011 from Corresponding European Application No. 08845213.1.

* cited by examiner

SELECT Interface/(Name, Status) FROM %Dell%

SEARCH

Results 1 - 4 of 4 for SELECT Interface/(Name, Status) FROM %Dell% in .0614 seconds List | Table | Chart | Graph Interface:
  Name: 'Eth0'
  Status: 'Up'

Interface:
  Name: 'Eth1'
  Status: 'Down'

Interface:
  Name: 'Eth0'
  Status: 'Down'

Interface:
  Name: 'Eth1'
  Status: 'Up'

FIG. 7

METHOD AND APPARATUS FOR SEARCHING A HIERARCHICAL DATABASE AND AN UNSTRUCTURED DATABASE WITH A SINGLE SEARCH QUERY

CROSS-REFERENCE TO RELATED APPLICATIONS

The present application is a continuation of U.S. application Ser. No. 11/982,699, filed Nov. 2, 2007, the disclosure of which is incorporated by reference herein.

BACKGROUND

1. Field

Embodiments of the invention relate to the field of database searching; and more specifically, to the searching of a hierarchical database and an unstructured database with a single search query.

2. Background

Data may be stored in numerous fashions both unstructured and structured. The term "structured data" is used to refer to data that has some structure associated with the data. For example, a relational database contains structured data as the data within the relational database is structured into tables, columns, and rows. Typically, searching structured data requires knowledge of the underlying structure. For example in the case of the relational database, searching the relational database requires knowledge of the table names. Additionally, searching a relational database requires knowledge of a rigid searching syntax, such as SQL.

Structured data may also be stored in a hierarchical database. The hierarchical database can be a tree, where each data element can be considered a node of the tree. Similarly as with relational databases, searching the structured data in the hierarchical database requires knowledge of the hierarchical structure (e.g., nodes of the tree) and also requires knowledge of a searching syntax.

The term "unstructured data" is used to refer to data that does not have structure associated with the data. A common example of unstructured data is data stored in virtual documents in an inverted index. The term "virtual document" is used to refer to representation of data as textual data that may be indexed. As the data in an inverted index is unstructured, searching the inverted index typically consists of entering in keywords. The term "keyword" is used to refer to a search string. Thus, unlike searching structured data, searching unstructured data does not require knowledge of a rigid searching syntax. However, a disadvantage of searching unstructured data is that the results may not be accurate as keywords may be shared across numerous data sets.

Relational databases have a limited text searching feature. Relational databases are commonly made up of multiple relations (often called tables), which may or may not be connected. Each relation typically represents a different data domain. For example, one relation may represent product suppliers and another relation may represent clients. In order to maintain the structure of the relations within a search result, text searching is performed on a per relation basis. In other words, as the relations represent different data domains, text searching across the multiple data sets would not result in meaningful results as there would not be an indication of which relation the result belongs to. Thus, prior art relational database text searching has the disadvantage that knowledge of a particular relation is required. Additionally, when there are multiple relations a separate text search must be performed on each relation.

Prior art techniques exist that convert structured data into unstructured data to allow for full text searching. For example, data within a relational database may be converted to a format suitable for unstructured searching (e.g., converted into an inverted index to allow for keyword searching). However, a disadvantage of converting data stored in a structured manner into data stored in an unstructured manner is that while searching may be easier for a user (e.g., the user does need to know the structure or special syntax) the results of the search will not include the associated structure.

Other prior art techniques exist that support keyword based searches in association with manual relational database searching. In these techniques, virtual documents are built from a relational database and are indexed into an inverted index. The virtual documents are associated with relation tuples of the relational database (e.g., by using identifiers). Keyword based searches can be performed on the inverted index where the returned results are the identifiers to the relations matching the search. The returned results may contain multiple identifiers in the case where the keyword search term matches multiple virtual documents, and thus multiple tuples. For each identifier that is returned in the result, a user is required to manually search the relational database relation corresponding to that identifier. Thus, in this prior art technique, the keyword search acts as a hint as to where in the relational database the information is located. However, this prior art technique has the disadvantage that if there are multiple identifiers, the user is required to manually search each tuple for each identifier (i.e., the user must manually form a structured query for each identifier). Additionally, if the identifiers correspond to different relations, the user is required to manually search each relation for each identifier (i.e, the user must manually form a structured query for each identifier).

BRIEF DESCRIPTION OF THE DRAWINGS

The invention may best be understood by referring to the following description and accompanying drawings that are used to illustrate embodiments of the invention. In the drawings:

FIG. 7 is an exemplary results screen in response to a user generating a single search query to search a hierarchical database and an inverted index from selecting item(s) returned as a result from a previous unstructured search according to one embodiment of the invention.

DETAILED DESCRIPTION

Figure 1:
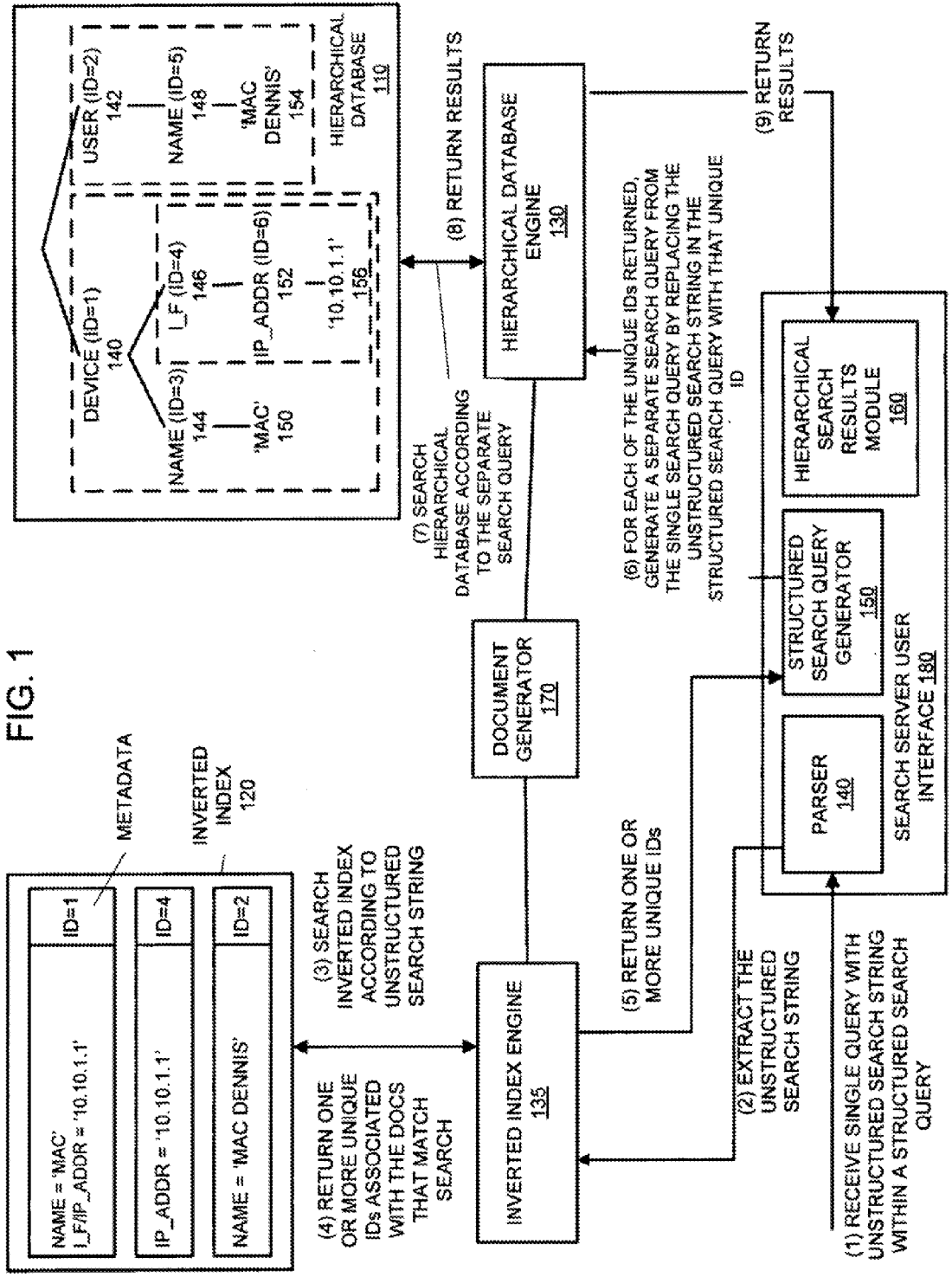
FIG. 1 is a data flow diagram illustrating an exemplary system to search a hierarchical database and an inverted index with a single search query according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

A method and apparatus for searching a hierarchical database and an unstructured database with a single search query is described. In one embodiment virtual documents are generated from the hierarchical database and are indexed into an inverted index along with associated identifiers of the hierarchical database. A single search query searches the inverted index and from that result automatically searches the hierarchical database.

FIG. 1 is a data flow diagram illustrating an exemplary system to search a hierarchical database and an unstructured database with a single search query according to one embodiment of the invention. It should be understood that while this data flow diagram and other data flow diagrams illustrate steps to be performed at a time, the order in which they can be performed is exemplary and the order may be performed differently by certain embodiments.

Referring to FIG. 1, at a time 1, a single search query with an unstructured search string within a structured search query is received by search server user interface 180 to automatically cause a search of inverted index 120 and use of the result to automatically search hierarchical database 110. It should be understood that the use of an inverted index as an unstructured database is exemplary and other unstructured databases may be used (e.g., a forward index, a trie, a vector space model, etc.). While in one embodiment of the invention the single search query originates from a user entering in the query from a graphical user interface (e.g., a web browser), in alternative embodiments of the invention the query originates from different sources (e.g., from an application, from a command line interface, etc.). Examples illustrating a single search query will be discussed with reference to FIG. 2A.

Within search server user interface, parser 140 extracts the unstructured search string from within the structured search query and forwards the unstructured search string to inverted index engine 135 at a time 2. Inverted index engine 135 accepts the unstructured search string and at a time 3 searches inverted index 120 according to the unstructured search string.

Inverted index 120 includes virtual documents that were selectively generated from hierarchical database 110. Each virtual document is associated with metadata that includes a unique identifier from the hierarchical database 110 used to designate the data in the hierarchical database 110 from which that virtual document was created. According to another embodiment, metadata also can include path information from the hierarchical database 110. Each unique identifier represents a point in hierarchical database 110. A point in hierarchical database 110 may be any data element in the hierarchal database that is not a value according to one embodiment (e.g., a node in hierarchical database may be a point). For example, in FIG. 1 each point in hierarchical database 110 includes a unique identifier. Note that values of hierarchical database 110 do not include a unique identifier.

Each virtual document includes information from a starting point and all points and values beneath that starting point. For example, in FIG. 1, the virtual document NAME='MAC DENNIS' is associated with unique identifier two (ID=2) and includes information from point NAME (ID=5) and the value 'MAC DENNIS'. The virtual document was designated to be generated from the point ID=2 and below. Thus, unique identifier two (ID=2) represents the point of /USER in hierarchical database 110. There may be overlapping data indexed in inverted index 120 depending on the manner in which the virtual documents are generated. For example, the virtual document

---
NAME = 'MAC'
I_F/IP_ADDR = '10.10.1.1'

--- that is associated with unique identifier one (ID=1) includes information that is also included in the virtual document IP_ADDR='10.10.1.1' that is associated with unique identifier. four (ID=4). A more detailed description of generating virtual documents from hierarchical database 110 will be discussed in reference to FIG. 3.

As previously described, inverted index engine 135 searches inverted index 120 according to the unstructured search string. At a time 4, inverted index engine 135 receives the results of that search, which include one or more unique identifiers associated with the virtual documents that match the search. According to another embodiment, inverted index engine 135 also receives path information instead of or in addition to the unique identifiers. Inverted index engine 135 at a time 5 forwards the results of the unstructured search string search to structured search query generator 150 within search server user interface 180.

At a time 6, for each of the unique identifiers returned from the unstructured search string search, structured search query generator 150 generates a separate search query from the single search query by replacing the unstructured search string in the structured search query with that unique identifier. In one embodiment structured search query generator 150 separately forwards each generated separate search query to hierarchical database engine 130 to allow a search of the hierarchical database. In another embodiment, structured search query generator 150 forwards the separate search queries as a group and hierarchical database engine 130 determines an order that the separate search queries will be processed and used for the search.

Hierarchal database 110 is searched according to the separate search query at a time 7. Examples of syntax of the separate search query will be discussed with reference to FIG. 2B. At a time 8, hierarchical database receives the returned results and forwards the returned results to hierarchical search results module 160. While in one embodiment of the invention hierarchical search results module 160 formats the results of the separate search queries in a tree format, in alternative embodiments of the invention hierarchical search results module hierarchical search results module 160 formats the results of the separate search queries in different formats (e.g., table, list, graph, chart, etc.). Hierarchical search results module 160 may also be configured to allow the formatting of the results of the separate search queries to be user configurable and selectable. That is, a user may select the format in which the results are outputted. Furthermore, hierarchical search results module 160 may convert the results from one format to another format. For example, a user originally selected the results to be formatted in a tree format and later selects the results to be converted into a table, list, graph, chart, etc An exemplary search of hierarchical database 110 and inverted index 120 with a single search query that includes an unstructured search string within a structured search query will be described with reference to FIG. 2B.

Figure 2A:
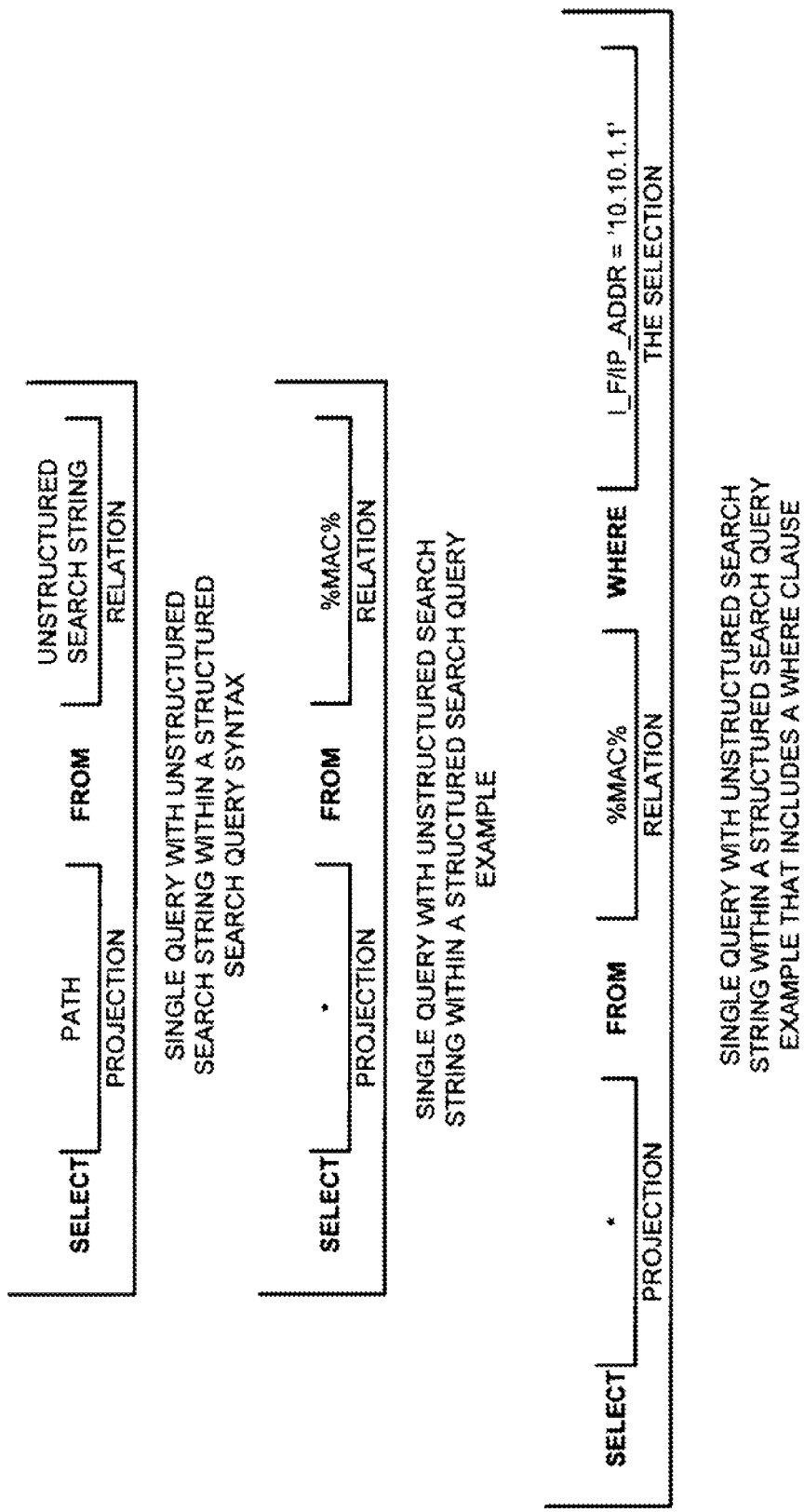
FIG. 2A is a block diagram illustrating exemplary single search query syntaxes configured to search a hierarchical database and an inverted index with the single query according to one embodiment of the invention.

FIG. 2A is a block diagram illustrating exemplary single search query syntaxes configured to search a hierarchical database and an inverted index with the single query according to one embodiment of the invention. As many database users are familiar with SQL, according to one embodiment of the invention the single search query with an unstructured search string within a structured search query uses features that are familiar to SQL users. For example, a simple single search query syntax may take the form of SELECT*FROM %Search String%. Similarly to SQL, the SELECT clause in the single search query is used to specify the data returned subject to the FROM clause. In the above simple example, the asterisk indicates that everything in the hierarchical database is to be returned subject to the FROM clause. In the case of a tree, everything in the tree will be returned subject to the FROM clause. Also similar to SQL, the FROM clause describes where in the database information should be returned from. In the case of a tree, the FROM clause represents which sub-tree the data will be searched from. A simple exemplary single search query with an unstructured search string within a structured search query syntax may take the following syntax: SELECT* FROM %MAC%. Also similar to SQL, a WHERE clause may be used to specify the selection. In other words, the WHERE clause restricts or filters the data returned. An example of a single search query with a WHERE clause is SELECT*FROM %MAC% WHERE I_F/IP_ADDR='10.10.1.1'.

Figure 2B:
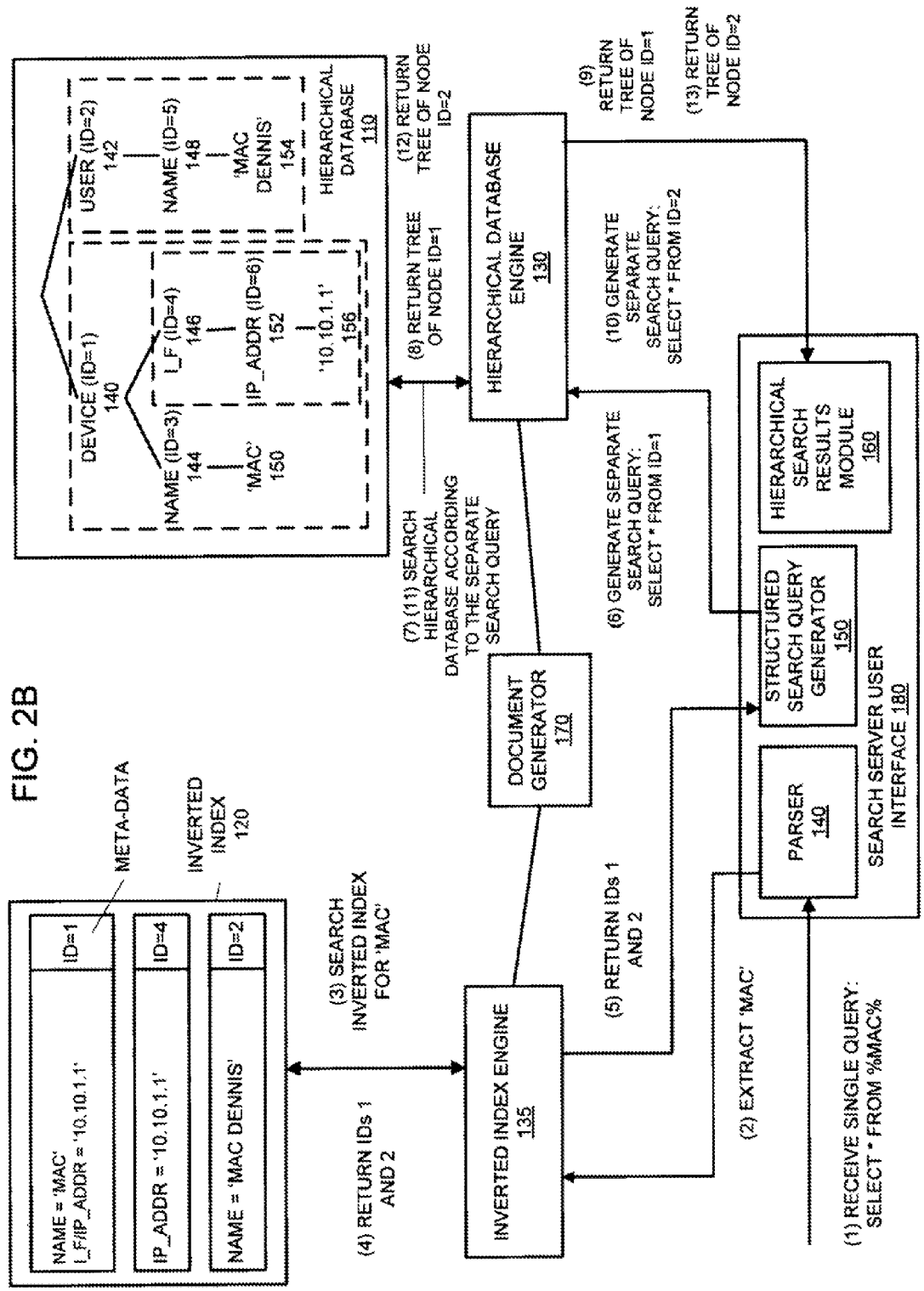
FIG. 2B is a data flow diagram illustrating an exemplary searching of a hierarchical database and an inverted index with a single search query according to one embodiment of the invention.

FIG. 2B is a data flow diagram illustrating an exemplary searching of a hierarchical database and an inverted index with a single search query according to one embodiment of the invention. In FIG. 2B, at a time 1 search server user interface receives the single query SELECT*FROM %MAC%. This single query has syntax identifying an unstructured search string (%MAC%) within a structured search query to automatically cause a search of inverted index 120 and use of that result to automatically search hierarchical database 110. At a time 2, parser 140 extracts the unstructured search string MAC from the structured search query. While in one embodiment of the invention a leading symbol % represents the beginning of a search string and a closing % represents the closing of the search string, in alternative embodiments of the invention different symbols or words or any combination of symbols and words may be used (e.g., "", ' ',  , && &&, $$, etc.). Parser 140 forwards the extracted unstructured search string 'MAC' to inverted index engine 135 to allow a search of the inverted index 120.

Inverted index 135 accepts the unstructured search string MAC and searches the inverted index 120 for the unstructured search string MAC. Thus inverted index 135 searches each virtual document in the inverted index for the occurrence of the search string 'MAC'. As the search string 'MAC' appears in two separate virtual documents (the virtual document associated with unique identifier one (ID=1) and the virtual document associated with unique identifier two (ID=2)), inverted index 135 will receive those unique identifiers (i.e., ID=1 and ID=2) as a result of the search. While in one embodiment of the invention only the unique identifiers are returned as a result of the search, in alternative embodiments of the invention path information is returned in addition to or in place of the unique identifiers. Inverted index engine 135 forwards the result including the unique identifiers to structured search query generator 150 at a time 5.

Structured search query generator 150 generates a separate search query by replacing the unstructured search string in the structured search query (%MAC%) with the first unique identifier received (ID=1) at a time 6. Thus, the structured search query generator 150 forwards the separate search query SELECT*FROM ID=1 to hierarchical database engine 130. Hierarchical database engine 130 searches the hierarchical database 110 according to this separate search query at a time 7. Thus, the hierarchical database engine searches everything in the tree starting at device node (ID=1) 140. Therefore device node 140 and everything below device node 140 is returned as a result of the search to hierarchical database engine 130 at a time 8. Hierarchical database engine 130 forwards the result to hierarchical search results module 160 at a time 9.

As there were two unique identifiers returned from the unstructured search string search, structured search query generator 150 generates another separate search query for the second unique identifier received (ID=2) at a time 10. Thus, the structured search query generator 150 forwards the separate search query SELECT*FROM ID=2 to hierarchical database engine 130. Hierarchical database engine 130 searches the hierarchical database 110 according to this separate search query at a time 11. Thus, the hierarchical database engine searches everything in the tree starting at user node (ID=2) 142. Therefore user node 142 and everything below user node 142 is returned as a result of the search to hierarchical database engine 130 at a time 12. Hierarchical database engine 130 forwards the result to hierarchical search results module 160 at a time 13.

While in one embodiment of the invention hierarchical search results module 160 formats the results of the separate search queries in a tree format, in alternative embodiments of the invention hierarchical search results module hierarchical search results module 160 formats the results of the separate search queries in different formats (e.g., table, list, graph, chart, etc.). Hierarchical search results module 160 may also be configured to allow the formatting of the results of the separate search queries to be user configurable and selectable. That is, a user may select the format in which the results are outputted. Furthermore, hierarchical search results module 160 may convert the results from one format to another format. For example, a user originally selected the results to be formatted in a tree format and later selects the results to be converted into a table, list, graph, chart, etc.

Note that the results of the separate search queries in the above example were across multiple relations of hierarchical database 110. That is, the results of the separate search queries included information from different data domains, in this case a device domain and a user domain. Thus, a single search query (in our example SELECT*FROM %MAC%) searched multiple data domains in the hierarchical database and results from the multiple data domains retain the structure associated with the data (e.g., the tree structure) and were returned from that single search query. Furthermore the searching of the hierarchical database with the results of the unstructured search string search was performed automatically without any user action required. Thus a user is not required to manually form a structured search query for each of the results received from the unstructured search string search Thus a single search including a search string may be performed over a large number of data domains in a hierarchical database where the results retain the structure associated with the data. While the example single search query and the example hierarchical database were both rather simple, it should be understood that a typical database may include a large number of data domains.

Although the result of the above single search query does not include partial duplicative results, partial duplicative results are possible depending on the single search query and the virtual documents generated. For example, in FIG. 2B, if the unstructured search string search returns the unique identifiers associated with device 140 (id=1) and I_F 146 (id=4), the results of the separate search queries may include partial duplicative results as the data described by the virtual document associated with I_F 146 (id=4) is completely within the data described by the virtual document associated with device 140 (id=1). In other words, the data returned from node I_F 146 (id=4) is nested within the data from the node device 140 (id=1). An example of a single search query that would return partial duplicative results is SELECT*FROM %10%. As a user may not want such partial duplicative results, in one embodiment of the invention hierarchical search results module determines whether there is partial duplicative data and handles this in one of a number of ways (e.g., keep only the most narrow results (i.e., the furthest nested data), keep only the most broad results (i.e., the data that includes the most information), a combination based on user selection, etc.). In another embodiment of the invention, partial duplicative results are displayed to the user so as to allow the user to fine tune the query or to view a broader result set.

Although not shown in FIG. 2B, in certain embodiments of the invention the values stored in hierarchical database 110 are associated with timestamp values. These timestamp values may identify the historical record of the values. While in one embodiment of the invention a different timestamp is associated with a value each time the value is added or changed, in an alternative embodiment of the invention a different timestamp is associated with a value at certain predefined periods of time (e.g., hourly, daily, weekly, monthly, etc.). These timestamp values may be displayed along with the values according to certain embodiments of the invention. Additionally, in one embodiment of the invention hierarchical search results module 160 determines whether values returned from the search are stale. Values are stale if the values are associated with a timestamp that is excessively old (i.e., the timestamp should have been updated but has not). If the value is stale, it is likely that the value is not current and should not be automatically displayed to the user. Thus, in one embodiment of the invention hierarchical search results module 160 hides stale values (e.g., does not display the stale values) from the user. A user may optionally configure hierarchical search results module 160 to display the hidden stale values.

Figure 2C:
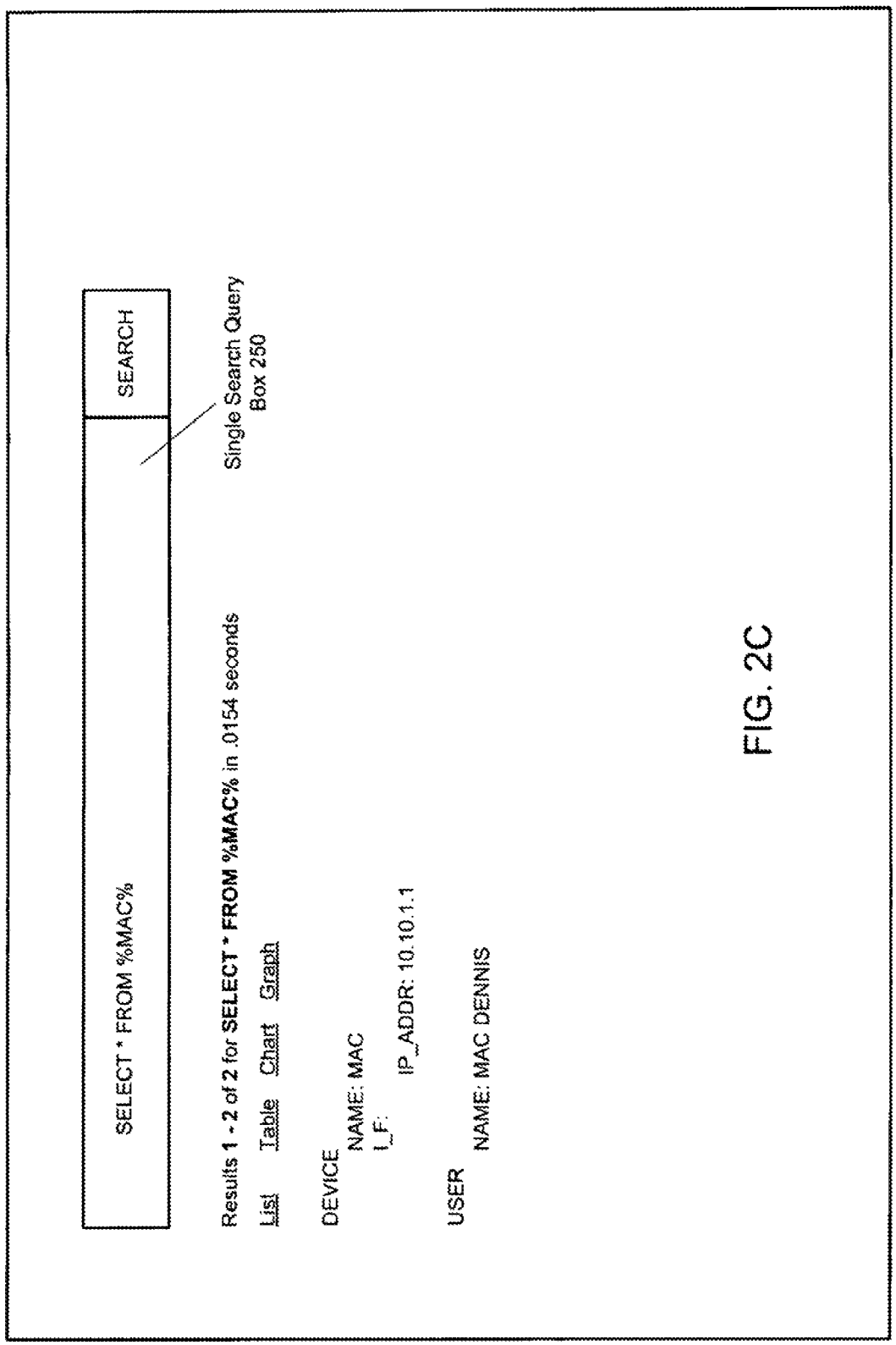
FIG. 2C is a block diagram illustrating an exemplary results screen of a single search query configured to search a hierarchical database and an inverted index according to one embodiment of the invention.

FIG. 2C is a block diagram illustrating an exemplary results screen of a single search query configured to search a hierarchical database and an inverted index according to one embodiment of the invention. The results screen can be displayed on any web browser or displayed from any stand alone application. Included in the results screen is single search query box 250 which is configured to accept the single search query. The single search query is displayed along with the results to remind the user of what the particular single search query was. To illustrate, the results screen in FIG. 2C corresponds to the single search query as described in FIG. 2B. Thus, the single search query SELECT*FROM %MAC% is displayed in single search query box 250.

Included in FIG. 2C are results from the search performed as described in FIG. 2B. The results are formatted as a tree in FIG. 2C, however in alternative embodiments of the invention results may be formatted differently (e.g., as a list, as a table, as a chart, as a graph, etc.). Furthermore, the results screen in FIG. 2C is configured to allow a user to format the results in different formats. For example, the user may convert the results from a tree format to a table format by selecting the Table function included in FIG. 2C.

Figure 3:
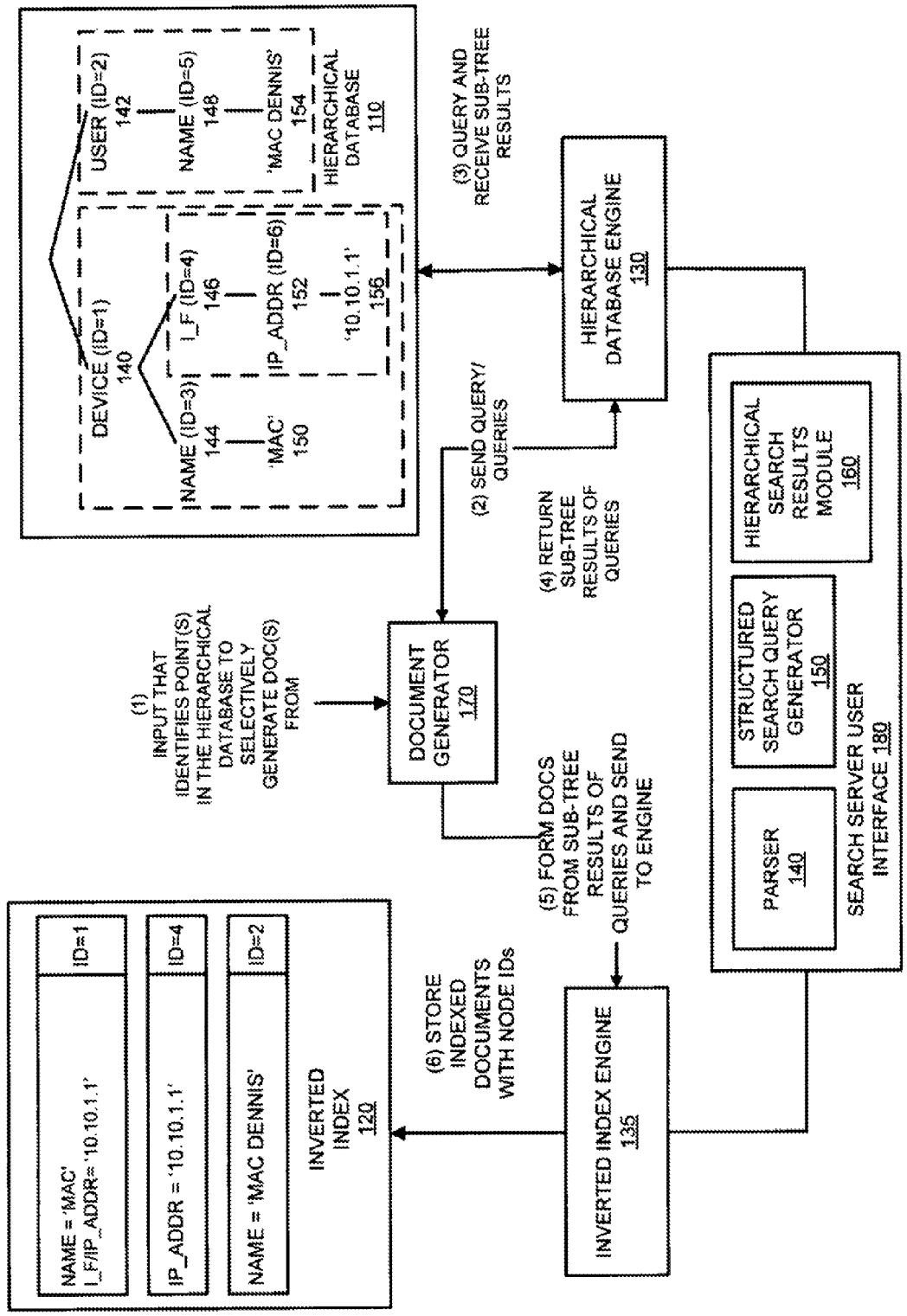
FIG. 3 is a data flow diagram illustrating an exemplary system for generating virtual documents from a hierarchical database and indexing those virtual documents into an inverted index according to one embodiment of the invention.

Note that the results shown in FIG. 2C of the single search query used in FIG. 2B included multiple relations of hierarchical database 110. That is, the results of the single search query included information from different data domains, in this case a device domain and a user domain. Thus, a single search query (in our example SELECT*FROM %MAC%)

searched multiple data domains in the hierarchical database and results from the multiple data domains retain the structure associated with the data (e.g., the tree structure) and were returned from that single search query. Furthermore the searching of the hierarchical database with the results of the unstructured search string search is performed automatically without any user action required. Thus a user is not required to manually form a structured search query for each of the results received from the unstructured search string search FIG. 3 is a data flow diagram illustrating an exemplary system for selectively generating virtual documents from a hierarchical database and indexing those virtual documents into an inverted index according to one embodiment of the invention. As previously described, virtual documents are selectively generated from data stored in hierarchical database 110. At a time 1, document generator 170 receives input that identifies point(s) in hierarchical database 110 to selectively generate the virtual document(s) from. A point in hierarchical database 110 may be the sub-tree root node of any of the sub-trees in hierarchical database 110. A sub-tree begins at a node that is a child of the root node and is not a value. The sub-tree root node is the top node of the sub-tree. The sub-tree includes information starting at the sub-tree root node and traversing through each child node of the sub-tree and ending with at least one value. For example in FIG. 3, device 140, user 142, name 144, I_F 146, name 148, and IP_addr 152 a each sub-tree root nodes and may be identified as a point in hierarchical database 110 where a virtual document is selectively generated from. Note that it is possible for one sub-tree to include another sub-tree. Thus, each virtual document generated represents a sub-tree in hierarchical database 110.

The input that identifies point(s) in hierarchical database 110 may originate from numerous entities or modules. In one embodiment of the invention the input is received from a user selecting point(s) in hierarchical database 110 by browsing a visual representation of hierarchical database 110 where the user decides the point(s) from which to generate virtual document(s) from. In another embodiment of the invention the input is received from a user using a command line interface to identify the point(s) in hierarchical database 110 to selectively generate the virtual document(s) from. In another embodiment of the invention the input that identifies point(s) in hierarchical database 110 to generate the virtual document(s) from is received automatically as a result of an algorithm. For example, an algorithm may select as a point to generate virtual documents from each node in the hierarchical database that includes at least one child node. As another example, an algorithm may select as a point to generate virtual documents from every node in the hierarchical database. As yet another example, an algorithm may select as a point to generate virtual documents from all nodes of a certain data domain (e.g., all nodes of the type DEVICE). Thus, it should be understood that the input that identifies point(s) in hierarchical database 110 to selectively generate virtual document(s) from may originate from various sources and/or combination of sources.

In FIG. 3, input has been received that identifies three points in hierarchical database 110 to generate virtual document(s) from: sub-tree root node device 140, sub-tree root node I_F 146, and sub-tree root node user 142. The virtual documents to be generated are illustrated by dashed lines within hierarchical database 110. As can be seen in FIG. 3, the virtual document corresponding to sub-tree root node device 140 includes the information in the virtual document corresponding to sub-tree root node I_F 146.

Once the point(s) are identified, document generator 170 sends appropriate query/queries to hierarchical database engine 130 to obtain the data required for the virtual document(s) at a time 2. An example query syntax may take the form of SELECT*FROM "point". As previously described, each point identified represents a sub-tree in hierarchical database 110. Hierarchical database engine 130 queries hierarchical database 110 according to the received queries and receives the sub-tree results of those queries, including the sub-tree root node identifier at a time 3. At a time 4, hierarchical database engine 130 returns the sub-tree results of the query/queries to document generator 170.

Document generator 170 forms a virtual document for each of the sub-tree results of the queries and sends these virtual documents to inverted index engine 135 at a time 5. Inverted index engine 135 indexes each virtual document into inverted index 120 and causes the storage of the indexed virtual documents with the sub-tree root node identifiers at a time 6. As shown in FIG. 3, three virtual documents were created as a result of the input received at document generator 170 and each of the virtual documents represents a sub-tree (and are associated with the sub-tree root node) of hierarchical database 110.

Figure 4:
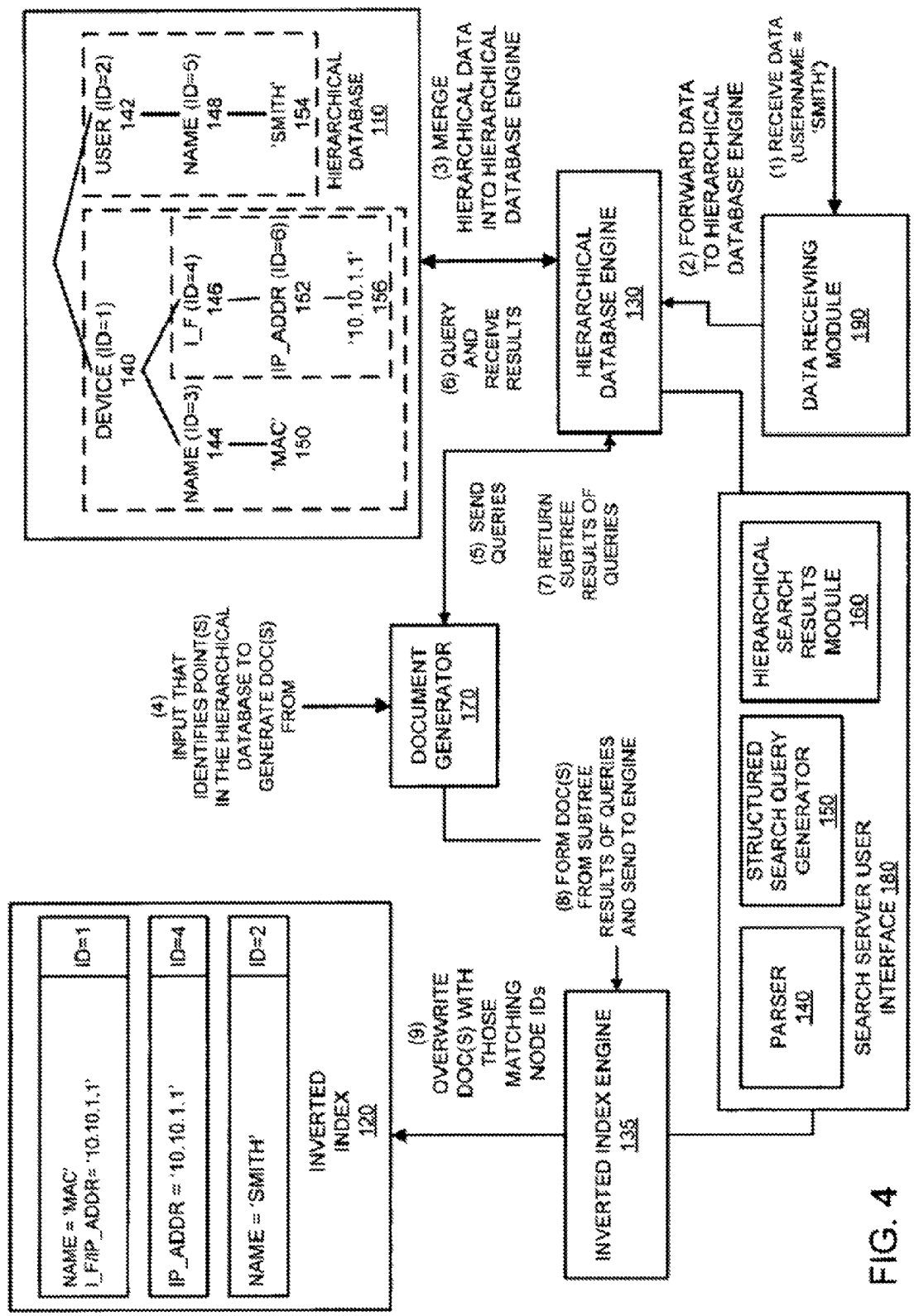
FIG. 4 is a data flow diagram illustrating an exemplary system for generating virtual document(s) from a hierarchical database and indexing those virtual documents into an inverted index upon receipt of data according to one embodiment of the invention.

FIG. 4 is a data flow diagram illustrating an exemplary system for generating virtual document(s) from a hierarchical database and indexing those virtual documents into an inverted index upon receipt of data according to one embodiment of the invention. Originally, the data stored in hierarchical database 110 is the same as described in FIG. 3. At a time 1, data receiving module 190 receives data User/Name='Smith'. While in one embodiment of the invention the received data originates from a user manually requesting data to be added to hierarchical database, in alternative embodiments of the invention the received data originates from a user or module (e.g., a crawler traversing information) and it is unclear whether the data is already included in hierarchical database 110. Regardless from where the received data originated from, data receiving module 190 does not know whether the data received is already included in hierarchical database 110. As a result, at a time 2, data receiving module sends a query to hierarchical database engine 130 that is configured to add new data to hierarchical database 110, update existing data in hierarchical database 110, or take no action. For example, the query MERGE INTO/VALUES {user[id=2]=>{name=>'Smith'}} is configured such that if a user node with an id=2 exists in the tree the value associated with the leaf node name is updated with the value 'Smith'. If a user node with an id=2 does not exist, then it is created along with the leaf node name and the value 'Smith'. According to one embodiment of the invention, if the information in the query is already included in the hierarchical database (e.g., the path, nodes, and values currently exist) the query will neither update nor add data to the hierarchical database.

Thus, in our example, at a time 3, hierarchical database engine causes the stored data User/Name='Mac Dennis' to be updated to User/Name='Smith'. At a time 4, document generator 170 receives input that identifies point(s) in hierarchical database 110 to selectively generate the virtual document(s) from. The input that is received to identify point(s) is described with reference to FIG. 3. Once the point(s) are identified, document generator 170 sends appropriate query/queries to hierarchical database engine 130 to obtain the data required for the virtual document(s) at a time 5. An example query syntax may take the form of SELECT*FROM "point".

Hierarchical database engine 130 queries hierarchical database 110 according to the received queries and receives the sub-tree results of those queries, including the sub-tree root node identifier at a time 6. At a time 7, hierarchical database engine 130 returns the sub-tree results of the query/queries to document generator 170. Document generator 170 forms a virtual document for each of the sub-tree results of the queries and sends these virtual documents to inverted index engine 135 at a time 8.

Inverted index engine 135 indexes each virtual document into inverted index 120 and causes the storage of the indexed virtual documents with the sub-tree root node identifiers at a time 9. While in one embodiment of the invention inverted index engine 135 replaces each virtual document stored in inverted index 120 with the corresponding virtual documents it has received from document generator 170, in alternative embodiments of the invention inverted index engine 135 replaces virtual documents stored in inverted index 120 only if the virtual document received from document generator 170 is different from the corresponding virtual document stored in the inverted index. For example, if inverted index 120 included the virtual documents as described in FIG. 3, and document generator sends inverted index engine 135 three virtual documents (corresponding to the dashed lines in hierarchical database 110 in FIG. 4), in one embodiment of the invention inverted index engine 135 causes the replacement of each of the originally stored virtual documents in inverted index 120 with the newly received virtual documents. In an alternative embodiment, inverted index engine 135 causes the replacement of only the virtual document associated with node identifier two as this is the only virtual document that has been modified.

Figure 5:
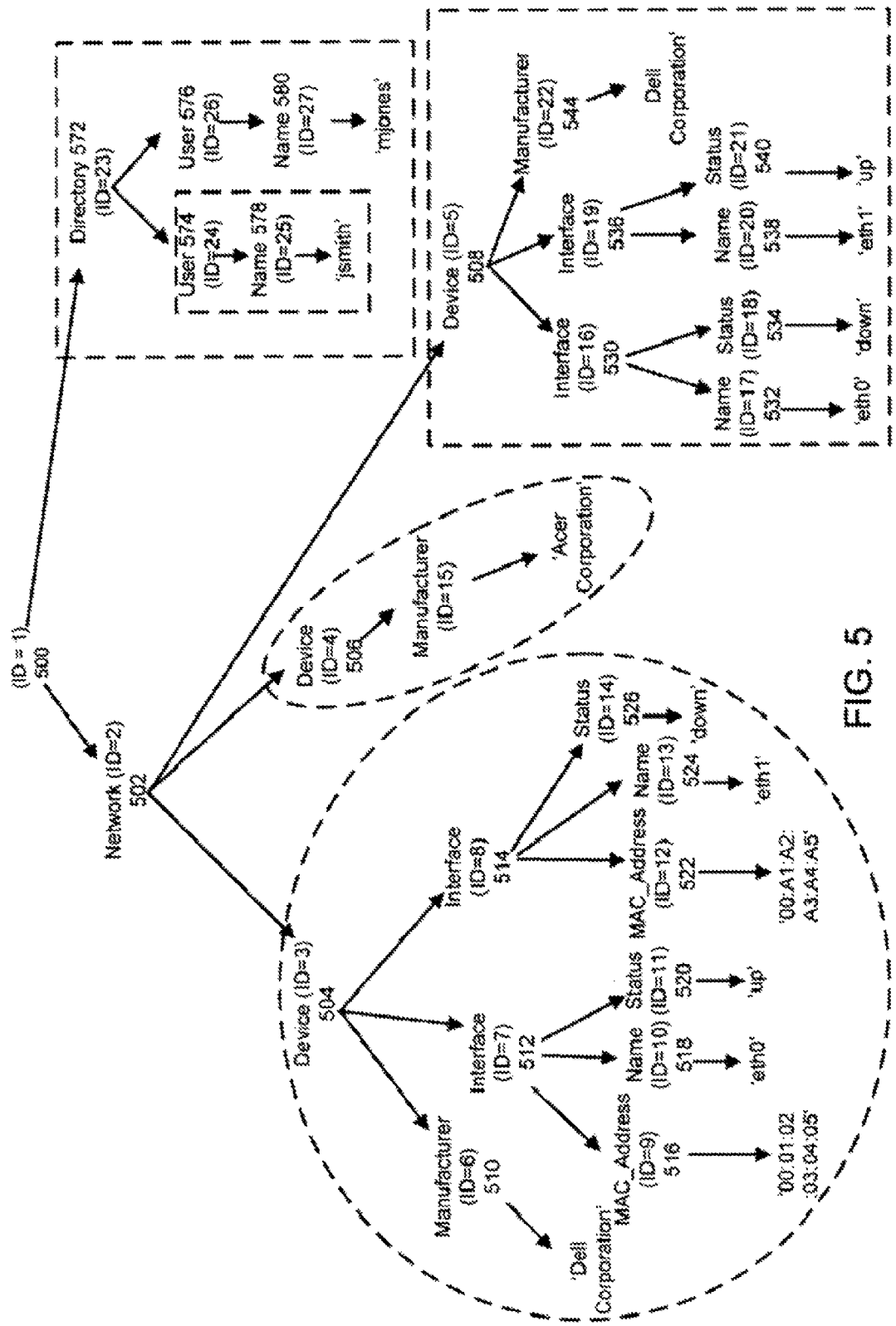
FIG. 5 is a block diagram illustrating an exemplary hierarchical structure according to one embodiment of the invention.

FIG. 5 is a block diagram illustrating an exemplary hierarchical structure of hierarchical database 110 according to one embodiment of the invention. In FIG. 5, the data of hierarchical database 110 is organized into a tree structure. Each data element (i.e., not a value) on the tree is a node of the tree. Each node on the tree has a corresponding unique identifier (e.g., a node identifier). For example, network node 502 has a unique identifier of two. At the top of the tree structure is the root node of the tree 500, which is represented by the symbol /. Directly below the root node exists two child nodes, network 502 and directory 572. A child node is a node, not a value, that itself descends from a node (e.g., a parent node or root node). Each parent node can have many child nodes, but each child node only has one parent. A child node may also be a parent node. For example, network 502 and directory 572 each are parent nodes in addition to being child nodes because they include one or more child nodes.

In addition, network 502 and directory 572 are each root nodes of a sub-tree. A sub-tree is a subset of the tree. A sub-tree includes information starting at the sub-tree root node and traversing through each child node of the sub-tree root node and ending with at least one value. Any node on the tree that itself has nodes below it (e.g., a parent node) can be referred to as a sub-tree root node. Thus, each sub-tree may include other sub-trees (i.e., the sub-trees may be nested within a sub-tree). There are many sub-trees in FIG. 5. For example as previously described, a sub-tree where network 502 is the sub-tree root node includes all the information, including values, from the nodes device 504, device 506, and device 508. As an example of a nested sub-tree, device 504 is a sub-tree root node for the sub-tree that includes all the information, including values, from the nodes manufacturer 510, interface 512, and interface 514. As another example of a nested sub-tree, the directory 572 includes the nodes users 574 and users 576, which include the nodes name 578 and names 580, respectively.

Values are associated with leaf nodes. For example, the node manufacturer 510 is a leaf node because it is associated with the value 510 'Dell Corporation'. While in one embodiment of the invention values are only associated with leaf nodes, in alternative embodiments of the invention any node in the hierarchy can have values associated with that node.

It should be understood that the data stored in hierarchical database 110 as shown in FIG. 5 is exemplary as many other types of data may be stored. As one example, the data includes technical data that IT professionals may find useful when fulfilling their duties. For example in one embodiment of the invention the data stored in hierarchical database includes information regarding substantially all devices within a LAN, a list of software installed on those devices, and a list of users authorized to use those devices. Additionally, the data stored may include information regarding the operating system version installed on substantially all devices within the LAN, the software which is running on substantially all devices within the LAN, and a configuration file from at least one router, switch, or firewall within the LAN. The devices may include substantially all workstations within a LAN, substantially all routers within the LAN, substantially all switches within the LAN, substantially all servers within the LAN, substantially all firewalls within the LAN, and substantially all directory servers within the LAN.

In another embodiment of the invention, the data stored in hierarchical database includes information regarding the existence of devices within one or more LANs (e.g., devices including one or more routers, one or more switches, one or more servers, one or more directory servers, and one or more workstations), existence of a plurality of hardware modules within each of the devices, states of the hardware modules, properties of the hardware modules, history of the hardware modules, existence of a peripheral coupled with at least one of the devices, states of the peripheral, properties of the peripheral, configuration of the peripheral, history of the peripheral, existence of at least one operating system operating within each of the devices, state of the operating systems, properties of the operating systems, configuration of the operating systems, history of the operating systems, existence of software within each of the devices, state of the software, properties of the software, configuration of the software, history of the software, and presence of users using each of the devices, an inventory of users that are authorized to use each of the devices, policies assigned to the users for each of the devices, and history of each users' actions regarding each of the devices.

While in one embodiment the database stored in the tree belongs to a single organization, in alternative embodiments of the invention each node existing directly below the tree root node (i.e., the child nodes directly below the root node) represents a private sub-tree where values and subsequent child nodes are private to an organization. Thus, while not illustrated in FIG. 5, multiple organizations may share the same tree data structure yet each organization can access only their data.

More complex single search queries will now be described with reference to FIG. 5. In FIG. 5, the virtual documents that have been generated and stored in the inverted index are represented by dashed lines. Similarly to SQL, in one embodiment of the invention a WHERE clause is used to specify the selection. In other words, the WHERE clause restricts or filters the data returned. For example, if one wants to find information regarding interfaces on Dell devices where the interface status is 'up', the following single search query may be used:

```
SELECT interface FROM %dell% WHERE
    interface/status='up'
```

The unstructured search string 'dell' is extracted from the query and the inverted index is searched according to 'dell'. The search finds two virtual documents that include the unstructured search string 'dell' (virtual document associated with device node 504 (node identifier of 3) and the virtual document associated with device node 508 (node identifier of 5)). Using the node identifiers associated with the virtual documents that matched the unstructured search string, two structured search queries are generated, SELECT interface FROM id 3 WHERE interface/status='up', and SELECT interface FROM id 5 WHERE interface/status='up'. These two queries produce the below result which includes nodes interface 512, MAC_address 516, name 518, and status 520; interface 536, name 538 and status 540 respectively:

```
interface:
    mac_address: '00:01:02:03:04:05'
    name: 'eth0'
    status: 'up'
interface:
    name: 'eth1'
    status: 'up'
```

Thus the single search query will display everything about all interfaces in a Dell device that have a status of 'up'.

Additionally, the WHERE clause may include paths. For example, if one wants to find information regarding devices that include the string 'Dell' where the interface status is 'up', the following single search query may be used:

```
SELECT * FROM %dell%
WHERE interface/status = 'up'
```

The unstructured search string 'dell' is extracted from the query and the inverted index is searched according to 'dell'. The search finds two virtual documents that include the unstructured search string 'dell' (virtual document associated with device node 504 (node identifier of 3) and the virtual document associated with device node 508 (node identifier of 5)). Using the node identifiers associated with the virtual documents that matched the unstructured search string, two structured search queries are generated, SELECT*FROM id 3 WHERE interface/status='up', and SELECT*FROM id 5 WHERE interface/status='up'. These two queries produce the below result which includes nodes device 504, manufacturer 510, interface 512, MAC_address 516, name 518, status 520, interface 514, MAC_address 522, name 524, and status 526; device 508, interface 530, name 532, status 534, interface 536, name 538 and status 540 respectively:

```
device:
    manufacturer: 'Dell Corporation'
    interface:
        mac_address: '00:01:02:03:04:05'
        name: 'eth0'
        status: 'up'
    interface:
        mac_address: '00:A1:A2:A3:A4:A5'
        name: 'eth1'
        status: 'down'
device:
    manufacturer: 'Dell Corporation'
    interface:
        name: 'eth0'
        status: 'down'
    interface:
        name: 'eth1'
        status: 'up'
```

Note that information regarding both interfaces on both Dell devices were displayed. The reason is that the SELECT clause asked for information about Dell devices where an interface status was 'up'. That is, if a device has multiple interfaces, the query returns information regarding all interfaces if at least one interface has a status of 'up'.

Additionally, the WHERE clause may include more than one path. For example, if a user would like to find information about all devices made by Dell that have an interface named 'eth0' and the status of that interface is 'up', the user may enter in the following single search query:

```
SELECT * FROM %dell%
WHERE interface/name = 'eth0' and
    interface/status = 'up'
```

The unstructured search string 'dell' is extracted from the query and the inverted index is searched according to 'dell'. The search finds two virtual documents that include the unstructured search string 'dell' (virtual document associated with device node 504 (node identifier of 3) and the virtual document associated with device node 508 (node identifier of 5)). Using the node identifiers associated with the virtual documents that matched the unstructured search string, two structured search queries are generated, SELECT*FROM id 3 WHERE interface/name='eth0' and interface/status='up', and SELECT*FROM id 5 WHERE interface/name='eth0' and interface/status='up'. These two queries produce the following result:

```
device:
    manufacturer: 'Dell Corporation'
    interface:
        mac_address: '00:01:02:03:04:05'
        name: 'eth0'
        status: 'up'
    interface:
        mac_address: '00:A1:A2:A3:A4:A5'
        name: 'eth1'
        status: 'down'
device:
    manufacturer: Dell Corporation
    interface:
        name: 'eth0'
        status: 'down'
    interface:
        name: 'eth1'
        status: 'up'
```

Note that this query generates results for device 504 (ID=3) and device 508 (ID=5) and not results only with Dell devices that have an interface named 'eth0' that is 'up'. This is because the query is asking for Dell devices that have an interface named 'eth0' and have an interface that has a status of 'up'. The quiery does not specify that the interface named 'eth0' be 'up'. In other words, the two paths in the WHERE clause are not correlated.

To correlate the paths the following single search query may be used:

```
SELECT * FROM %dell% WHERE interface/
(name = 'eth0' and status = 'up').
```

This syntax correlates the two paths in the WHERE clause. Thus, this query outputs all information about Dell devices that have an interface named eth0 that is up. Thus, this query produces the following output:

```
device:
    manufacturer: 'Dell Corporation'
    interface:
        mac_address: '00:01:02:03:04:05'
        name: 'eth0'
        status: 'up'
    interface:
        mac_address: '00:A1:A2:A3:A4:A5'
        name: 'eth1'
        status: 'down'
```

In addition, a single search query may include paths in the SELECT clause. For example, if a user would like to find the interface name, and interface MAC address for all dell devices the following single search query may be used:

```
SELECT interface/mac_address, interface/name
FROM %dell%
```

The unstructured search string 'dell' is extracted from the query and the inverted index is searched according to 'dell'. The search finds two virtual documents that include the unstructured search string 'dell' (virtual document associated with device node 504 (node identifier of 3) and the virtual document associated with device node 508 (node identifier of 5)). Using the node identifiers associated with the virtual documents that matched the unstructured search string, two structured search queries are generated, SELECT interface/mac_address, interface/name FROM id 3, and SELECT interface/mac_address, interface/name FROM id 5. These two queries produces the following output:

```
row:
    mac_address: '00:01:02:03:04:05'
    mac_address: '00:A1:A2:A3:A4:A5'
    name: 'eth0'
    name: 'eth1'
row:
    mac_address: null
    mac_address: null
    name: 'eth0'
    name: 'eth1'
```

Note that the second separate structured query does not contain any data regarding the interface MAC Address. While in one embodiment of the invention a null value is returned if a node returned in a query result does not include a value, in alternative embodiments of the invention different results may be returned (e.g., error messages, the data is skipped, etc.). Note that the results are not correlated for each interface. In other words, the output does not reflect the relationship between the MAC address and the interface name as the paths are not correlated.

To correlate the paths the following syntax may be used:

SELECT interface/(mac_address, name) FROM %dell%

The unstructured search string 'dell' is extracted from the query and the inverted index is searched according to 'dell'. The search finds two virtual documents that include the unstructured search string 'dell' (virtual document associated with device node 504 (node identifier of 3) and the virtual document associated with device node 508 (node identifier of 5)). Using the node identifiers associated with the virtual documents that matched the unstructured search string, two structured search queries are generated, SELECT interface/(mac_address,name) FROM id 3, and SELECT interface/(mac_address, name) FROM id 5. These two queries produce the following output:

```
row:
    interface:
        mac_address: '00:01:02:03:04:05'
        name: 'eth0'
    interface:
        mac_address: '00:A1:A2:A3:A4:A5:
        name: 'eth1'
row:
    interface:
        mac_address: null
        name: 'eth0'
    interface:
        mac_address: null
        name: 'eth1'
```

Note that this output reflects the relationship between the MAC address and the interface name. This is because the single search query included correlation in the paths.

Figure 6:
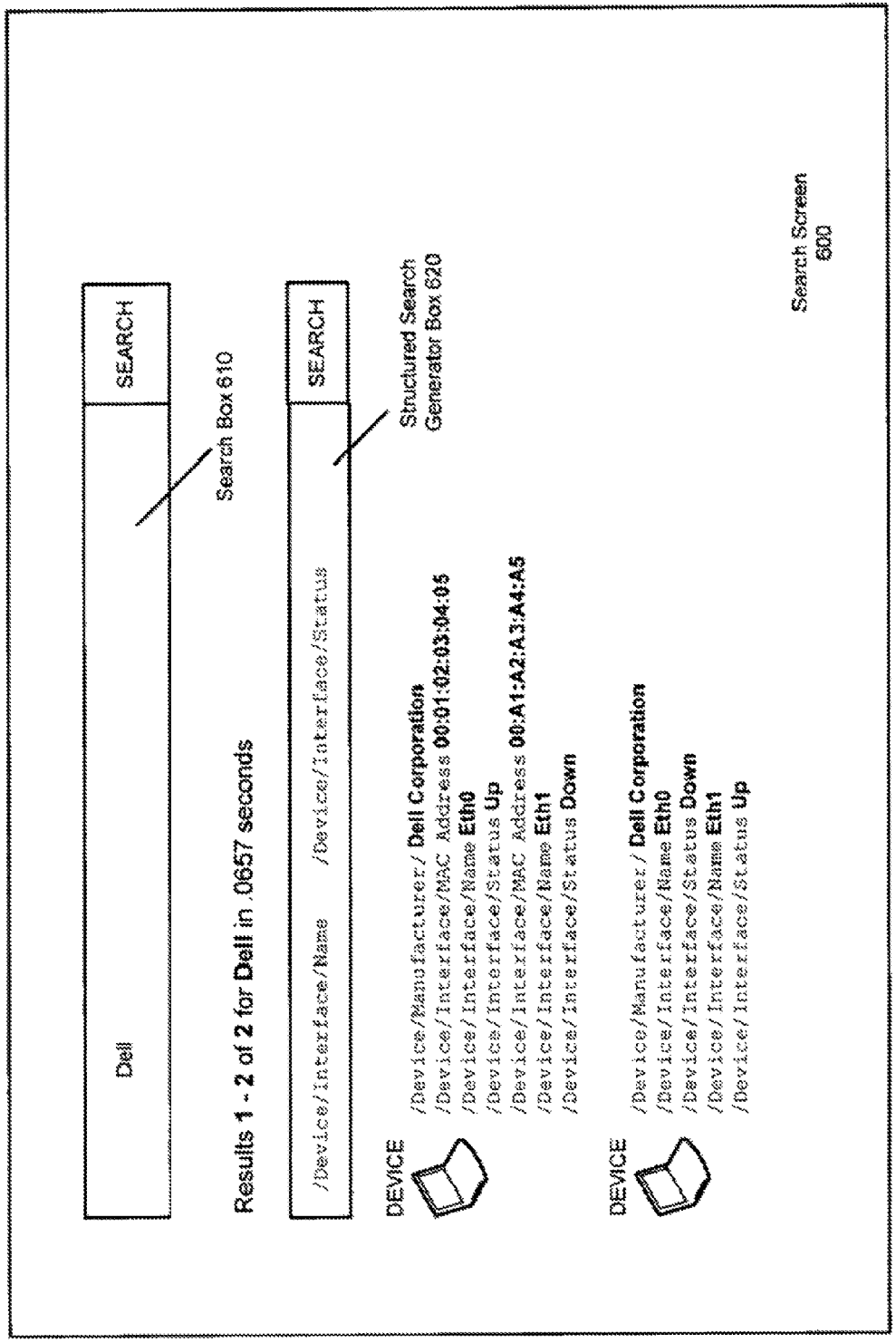
FIG. 6 is an exemplary search screen graphical user interface configured to allow a user to generate a single search query to search a hierarchical database and an inverted index by selecting items returned as a result from a previous unstructured search according to one embodiment of the invention.

FIG. 6 is an exemplary search screen graphical user interface configured to allow a user to generate a single search query to search a hierarchical database and an inverted index by selecting item(s) returned as a result from a previous unstructured search according to one embodiment of the invention. Search screen 600 includes search box 610 and structured search generator box 620. While in one embodiment of the invention search box 610 accepts only unstructured search queries, in alternative embodiments of the invention search box 610 accepts structured queries and queries with an unstructured search string within a structured search query.

In the example of FIG. 6, a user has searched the inverted index for the search string 'Dell'. In this example, the database described in FIG. 5 will be used. Thus, the results outputted to search screen 600 correspond to the virtual documents defined in FIG. 5 that include the string 'Dell'. As can be seen, two results have been returned. Once a user has searched the inverted index with an unstructured search string, the user may construct a structured search by selecting certain items in the result. The user may select items by any known methods (e.g., using a cursor to select, using a mouse to select, using a touch screen to select, etc.). As an example of a selection, in FIG. 6 a user has selected two paths in which to generate a structured search query from (/device/interface/name, and/device/interface/status).

FIG. 7 is an exemplary results screen in response to a user generating a single search query to search a hieraichical database and an inverted index from selecting item(s) returned as a result from a previous unstructured search according to one embodiment of the invention. The items selected by a user in FIG. 6 have been converted into a single search query to search the hierarchical database and an inverted index.

The single search query has produced four results as can be seen in FIG. 7. While in one embodiment the results are formatted as a tree, in alternative embodiments of the invention results may be formatted differently (e.g., as a list, as a table, as a chart, as a graph, etc.). Furthermore, the results screen in FIG. 7 is configured to allow a user to format the results in different formats. For example, a user may convert the results from a tree format to a table format by selecting the Table function included in FIG. 7.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of searching a hierarchical database and an inverted index, the method comprising:
receiving a single search query that has syntax identifying an unstructured search string within a structured search query to automatically cause a search of the inverted index and use of the result to automatically search the hierarchical database;
extracting the unstructured search string from the single search query;
searching the inverted index according to the unstructured search string, wherein the inverted index includes virtual documents created from data stored in the hierarchical database, wherein each virtual document includes a unique identifier from the hierarchical database used to designate the data in the hierarchical database from which that virtual document was created, wherein the unique identifier identifies the virtual document, wherein the searching includes comparing the unstructured search string to text contained within each virtual document, and wherein a result of the inverted index search includes the unique identifiers of those of the virtual documents that contain text matching the complete unstructured search string; and for each of the virtual documents in the result,
generating a separate search query from the single search query by replacing the unstructured search string in the structured search query with the unique identifier identifying the virtual document, wherein the separate search query is different from the single search query and different from the structured search query, and
searching the hierarchical database according to the separate search query.

2. The method of claim 1, wherein at least one unique identifier in the result corresponds to a virtual document that is associated to a first type of data in the hierarchical database, wherein the first type of data belongs to a first data domain, wherein at least one other unique identifier in the result corresponds to a different virtual document that is associated to a second type of data in the hierarchical database, and wherein the second type of data belongs to a different second data domain.

3. The method of claim 1, wherein the hierarchical database has a tree structure and the unique identifiers in the result correspond to identifiers of nodes of the tree.

4. The method of claim 1, wherein the hierarchical database includes collected information from across disparate information sources stored in a plurality of devices of a single LAN, wherein the collected information is organized by items of interest, and wherein the hierarchical database is not organized by documents located on the plurality of devices of the LAN.

5. The method of claim 1, wherein the single search query is formed in response to a selection of at least one item returned as a result from a previous unstructured search, wherein the structured search query includes the item selected, and the unstructured search string within the structured search query corresponds to the previous unstructured search string query.

6. The method of claim 1, wherein the hierarchical database has stored therein information regarding:
substantially all devices within a LAN,
a list of software installed on those devices, and
a list of users authorized to use those devices.

7. The method of claim 1, further comprising: receiving data to be merged in the hierarchical database; and merging the received data with the data stored in the hierarchical database upon receiving
a single merge query that has syntax for inserting the received data into the hierarchical database and updating the data in the hierarchical database with the received data, wherein the received data is updated upon determining that the received data changes values of the data already stored in the hierarchical database.

8. The method of claim 1, wherein the hierarchical database includes one or more sub-trees branching from a tree root node, wherein each sub-tree includes one or more nodes starting at a sub-tree root node, wherein each node has a unique identifier, wherein the virtual documents are created by selectively generating the virtual documents from the one or more sub-trees, and wherein each of the virtual documents corresponds to one of the one or more sub-trees and includes all nodes of that sub-tree.

9. The method of claim 8, wherein the virtual documents are selectively generated, at least in part by:
receiving inputs identifying points in the hierarchical database from which to generate the virtual documents, wherein each identified point in the hierarchical database represents sub-trees in the hierarchical database for a corresponding one of the virtual documents; and
for each of the virtual documents, in response to one of the identified points in the hierarchical database, sending queries to the hierarchical database to obtain the data for the virtual document from within the sub-trees in the hierarchical database represented by the identified point in the hierarchical database.

10. The method of claim 9, wherein receiving inputs identifying points in the hierarchical database includes receiving user indications of points within a visual representation of the hierarchical database;
wherein each of the unique identifiers identifying the virtual documents comprises the one of identified points in the hierarchical database from which the virtual document was generated.

11. The method of claim 1, wherein the syntax for the single search query includes a SELECT clause and a FROM clause, wherein the SELECT clause includes syntax to identify a path in the hierarchical database starting at a tree root node of the hierarchal database, and wherein the FROM clause includes the unstructured search string.

12. The method of claim 1, wherein the syntax for the single search query includes a first clause and a second clause;
wherein the first clause identifies a path in the hierarchical database starting at the tree root node;
wherein the second clause includes the unstructured search string; and
wherein extracting the unstructured search string from the single search query includes extracting the unstructured search string from the second clause of the of the single search query responsive to the syntax for the single search query.

13. A non-transitory computer-readable medium for searching a hierarchical database and an inverted index, the computer-readable medium comprising which, when implemented by one or more computers, cause the one or more computers to implement a method, the method comprising:
receiving a single search query that has syntax identifying an unstructured search string within a structured search query to automatically cause a search of the inverted index and use of the result to automatically search the hierarchical database;

extracting the unstructured search string from the single search query;

searching the inverted index according to the unstructured search string, wherein the inverted index includes virtual documents created from data stored in the hierarchical database, wherein each virtual document includes a unique identifier from the hierarchical database used to designate the data in the hierarchical database from which that virtual document was created, wherein the unique identifier identifies the virtual document, wherein the searching includes comparing the unstructured search string to text contained within each virtual document, and wherein a result of the inverted index search includes the unique identifiers of those of the virtual documents that contain text matching the complete unstructured search string; and for each of the virtual documents in the result,
generating a separate search query from the single search query by replacing the unstructured search string in the structured search query with the unique identifier identifying the virtual document, wherein the separate search query is different from the single search query and different from the structured search query, and searching the hierarchical database according to the separate search query.

14. The computer-readable medium of claim 13, wherein at least one unique identifier in the result corresponds to a virtual document that is associated to a first type of data in the hierarchical database, wherein the first type of data belongs to a first data domain, wherein at least one other unique identifier in the result corresponds to a different virtual document that is associated to a second type of data in the hierarchical database, and wherein the second type of data belongs to a different second data domain.

15. The computer-readable medium of claim 13, wherein the hierarchical database has a tree structure and the unique identifiers in the result correspond to identifiers of nodes of the tree.

16. The computer-readable medium of claim 13, wherein the hierarchical database includes collected information from across disparate information sources stored in a plurality of devices of a single LAN, wherein the collected information is organized by items of interest, and wherein the hierarchical database is not organized by documents located on the plurality of devices of the LAN.

17. The computer-readable medium of claim 13, wherein the single search query is formed in response to a selection of at least one item returned as a result from a previous unstructured search, wherein the structured search query includes the item selected, and the unstructured search string within the structured search query corresponds to the previous unstructured search string query.

18. The computer-readable medium of claim 13, wherein the hierarchical database has stored therein information regarding:
substantially all devices within a LAN,
a list of software installed on those devices, and
a list of users authorized to use those devices.

19. The computer-readable medium of claim 13, the method further comprising:
receiving data to be merged in the hierarchical database; and
merging the received data with the data stored in the hierarchical database upon receiving
a single merge query that has syntax for inserting the received data into the hierarchical database and updating the data in the hierarchical database with the received data, wherein the received data is updated upon determining that the received data changes values of the data already stored in the hierarchical database.

20. A system for searching a hierarchical database and an inverted index, the system comprising:
processing hardware; and
a memory comprising instructions which, when implemented by the processing hardware,
cause the processing hardware to implement a method, the method comprising:
receiving a single search query that has syntax identifying an unstructured search string within a structured search query to automatically cause a search of the inverted index and use of the result to automatically search the hierarchical database;
extracting the unstructured search string from the single search query;
searching the inverted index according to the unstructured search string, wherein the inverted index includes virtual documents created from data stored in the hierarchical database, wherein each virtual document includes a unique identifier from the hierarchical database used to designate the data in the hierarchical database from which that virtual document was created, wherein the unique identifier identifies the virtual document, wherein the searching includes comparing the unstructured search string to text contained within each virtual document, and wherein a result of the inverted index search includes the unique identifiers of those of the virtual documents that contain text matching the complete unstructured search string; and
for each of the virtual documents in the result,
generating a separate search query from the single search query by replacing the unstructured search string in the structured search query with the unique identifier identifying the virtual document, wherein the separate search query is different from the single search query and different from the structured search query, and
searching the hierarchical database according to the separate search query.

21. The system of claim 20, wherein at least one unique identifier in the result corresponds to a virtual document that is associated to a first type of data in the hierarchical database, wherein the first type of data belongs to a first data domain, wherein at least one other unique identifier in the result corresponds to a different virtual document that is associated to a second type of data in the hierarchical database, and wherein the second type of data belongs to a different second data domain.

22. The system of claim 20, wherein the hierarchical database has a tree structure and the unique identifiers in the result correspond to identifiers of nodes of the tree.

23. The system of claim 20, wherein the hierarchical database includes collected information from across disparate information sources stored in a plurality of devices of a single LAN, wherein the collected information is organized by items of interest, and wherein the hierarchical database is not organized by documents located on the plurality of devices of the LAN.

24. The system of claim 20, wherein the single search query is formed in response to a selection of at least one item returned as a result from a previous unstructured search, wherein the structured search query includes the item selected, and the unstructured search string within the structured search query corresponds to the previous unstructured search string query.

25. The system of claim 20, wherein the hierarchical database has stored therein information regarding:
   substantially all devices within a LAN,
   a list of software installed on those devices, and
   a list of users authorized to use those devices.

\* \* \* \* \*